(12) United States Patent
Yang

(10) Patent No.: US 12,469,661 B2
(45) Date of Patent: Nov. 11, 2025

(54) DC SOLID-STATE CIRCUIT BREAKER WITH FAIL-SAFE REDUNDANCY VIA DOUBLE POWER ELECTRONICS AND OVERVOLTAGE PROTECTION

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 385 days.

(21) Appl. No.: 18/186,984

(22) Filed: Mar. 21, 2023

(65) Prior Publication Data

US 2024/0321540 A1  Sep. 26, 2024

(51) Int. Cl.
*H01H 71/12* (2006.01)
*H02H 3/04* (2006.01)
*H02H 3/20* (2006.01)

(52) U.S. Cl.
CPC ............ *H01H 71/123* (2013.01); *H02H 3/04* (2013.01); *H02H 3/202* (2013.01)

(58) Field of Classification Search
CPC .... H01H 33/596; H01H 71/123; H01H 9/548; H02H 1/00; H02H 1/0007; H02H 1/0015; H02H 3/04; H02H 3/05; H02H 3/06; H02H 3/066; H02H 3/087; H02H 3/10; H02H 3/20; H02H 3/202; H02H 3/207; H02H 3/38; H02H 7/222; H02H 9/008; H02H 9/02; H02H 9/04; H02H 9/041
See application file for complete search history.

(56) References Cited

U.S. PATENT DOCUMENTS

| | | | |
|---|---|---|---|
| 10,971,919 B2 | 4/2021 | Böhm et al. | |
| 11,398,724 B1* | 7/2022 | Yang | H02H 3/08 |
| 12,316,095 B2* | 5/2025 | Yang | H02H 3/20 |
| 2010/0172063 A1* | 7/2010 | Liu | H02H 1/04 |
| | | | 361/118 |
| 2015/0022928 A1* | 1/2015 | Mohaddes Khorassani | ............ |
| | | | H02H 3/08 |
| | | | 361/93.7 |
| 2016/0197465 A1* | 7/2016 | Poulose | H02H 3/08 |
| | | | 361/91.5 |

(Continued)

FOREIGN PATENT DOCUMENTS

| | | | |
|---|---|---|---|
| CN | 2904421 Y | * | 5/2007 |
| CN | 108597926 A | | 9/2018 |

(Continued)

*Primary Examiner* — Danny Nguyen
*Assistant Examiner* — Nicolas Bellido

(57) ABSTRACT

A DC solid-state circuit breaker is provided with fail-safe redundancy. The DC solid-state circuit breaker comprises an air gap disposed in series to first and second power electronics switching modules. The DC solid-state circuit breaker further comprises a sensing and control circuit configured to realize designed functions. The DC solid-state circuit breaker further comprises first and second overvoltage protection devices connected in series for overvoltage or surge protection for the sensing and control circuit such that both the first and second overvoltage protection devices have threshold voltages higher than a system voltage. The DC solid-state circuit breaker further comprises a load side overvoltage protection device provided for overvoltage protection after switching OFF.

18 Claims, 4 Drawing Sheets

(56) References Cited

U.S. PATENT DOCUMENTS

| | | | |
|---|---|---|---|
| 2019/0334340 A1 | 10/2019 | Niehoff | |
| 2020/0366078 A1* | 11/2020 | Telefus | H02H 3/044 |
| 2022/0045497 A1* | 2/2022 | Yang | H02H 3/021 |
| 2022/0109296 A1* | 4/2022 | Chin | H03K 17/08142 |
| 2023/0230783 A1* | 7/2023 | Yang | H02H 3/42 |
| | | | 361/115 |
| 2023/0361560 A1* | 11/2023 | Yang | H02H 3/33 |
| 2024/0222956 A1* | 7/2024 | Yang | H02H 3/20 |
| 2024/0305086 A1* | 9/2024 | Yang | H02H 9/043 |
| 2024/0332948 A1* | 10/2024 | Yang | H01H 9/548 |
| 2025/0069837 A1* | 2/2025 | Kinsel | G01R 31/3275 |

FOREIGN PATENT DOCUMENTS

| | | | | |
|---|---|---|---|---|
| GB | 2628161 A | * | 9/2024 | H01H 9/54 |
| WO | 2022231735 A1 | | 11/2022 | |

\* cited by examiner

DC SOLID-STATE CIRCUIT BREAKER WITH FAIL-SAFE REDUNDANCY VIA DOUBLE POWER ELECTRONICS AND OVERVOLTAGE PROTECTION

BACKGROUND

1. Field

Aspects of the present invention generally relate to a DC solid-state circuit breaker with fail-safe redundancy including first and second power electronics switching modules as each other's redundancy and first and second overvoltage protection devices as each other's redundancy.

2. Description of the Related Art

In today's electricity distribution, alternate current (AC) power stays vast majority as a form of supply. However, many electronic devices and end systems, such as electric vehicle, home appliances and data centers use direct current (DC) power. Therefore, conversion between AC and DC is inevitable, and energy waste happens at the conversion point. A direct DC to DC supply is much more efficient. A fundamental issue of a DC supply system is that existing protection devices, such as circuit breakers, are mainly designed for an AC system and are not suitable for a similar voltage DC system. For example, a 120V AC rated circuit breaker cannot be used in a 125V DC system and can only be used with a lower DC voltage, such as 48V. This is mainly due to the contacts used in today's thermal-magnetic circuit breakers create arcs, which cannot be effectively extinguished without the natural zero crossing in AC systems. Therefore, a better DC circuit breaker design is needed.

Solid-state circuit breakers use power electronics as switching components instead of contacts as in traditional thermal-magnetic circuit breakers, and the switching process is arc free. Therefore, solid-state circuit breakers show promising aspects for use in both AC and DC systems. However, solid-state circuit breakers normally have an air gap in series of power electronic components for isolation purposes. For solid-state circuit breakers designed for AC systems, air gaps can be used as fail-safe mechanisms when power electronics fail in shorted conditions. In such a situation, the arc can simply interrupt AC powers with the help of natural zero crossing. In DC systems, as discussed above, air gaps can no longer be used for such purposes, because the possibility of its own failure on interruption.

Therefore, there is a need for an improved system architecture for a DC solid-state circuit breaker.

SUMMARY

Briefly described, aspects of the present invention relate to a solid-state circuit breaker for DC applications. In this invention, a system architecture with redundant power electronics and redundant overvoltage protection for a DC solid-state circuit breaker is proposed to reduce or eliminate DC arcs in air gaps under single component failure mode analysis. This DC solid-state circuit breaker realizes the full potential of solid-state technology in DC applications.

In accordance with one illustrative embodiment of the present invention, a DC solid-state circuit breaker is provided. It comprises an air gap disposed in series to first and second power electronics switching modules. The DC solid-state circuit breaker further comprises a sensing and control circuit configured to realize designed functions. The DC solid-state circuit breaker further comprises first and second overvoltage protection devices connected in series for overvoltage or surge protection for the sensing and control circuit such that both the first and second overvoltage protection devices have threshold voltages higher than a system voltage. The DC solid-state circuit breaker further comprises a load side overvoltage protection device provided for overvoltage protection after switching OFF.

In accordance with one illustrative embodiment of the present invention, a method is provided for providing fail-safe redundancy in a DC solid-state circuit breaker. The method comprises providing an air gap disposed in series to first and second power electronics switching modules. The method further comprises providing a sensing and control circuit configured to realize designed functions. The method further comprises providing first and second overvoltage protection devices connected in series for overvoltage or surge protection for the sensing and control circuit such that both the first and second overvoltage protection devices have threshold voltages higher than a system voltage. The method further comprises providing a load side overvoltage protection device provided for overvoltage protection after switching OFF.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
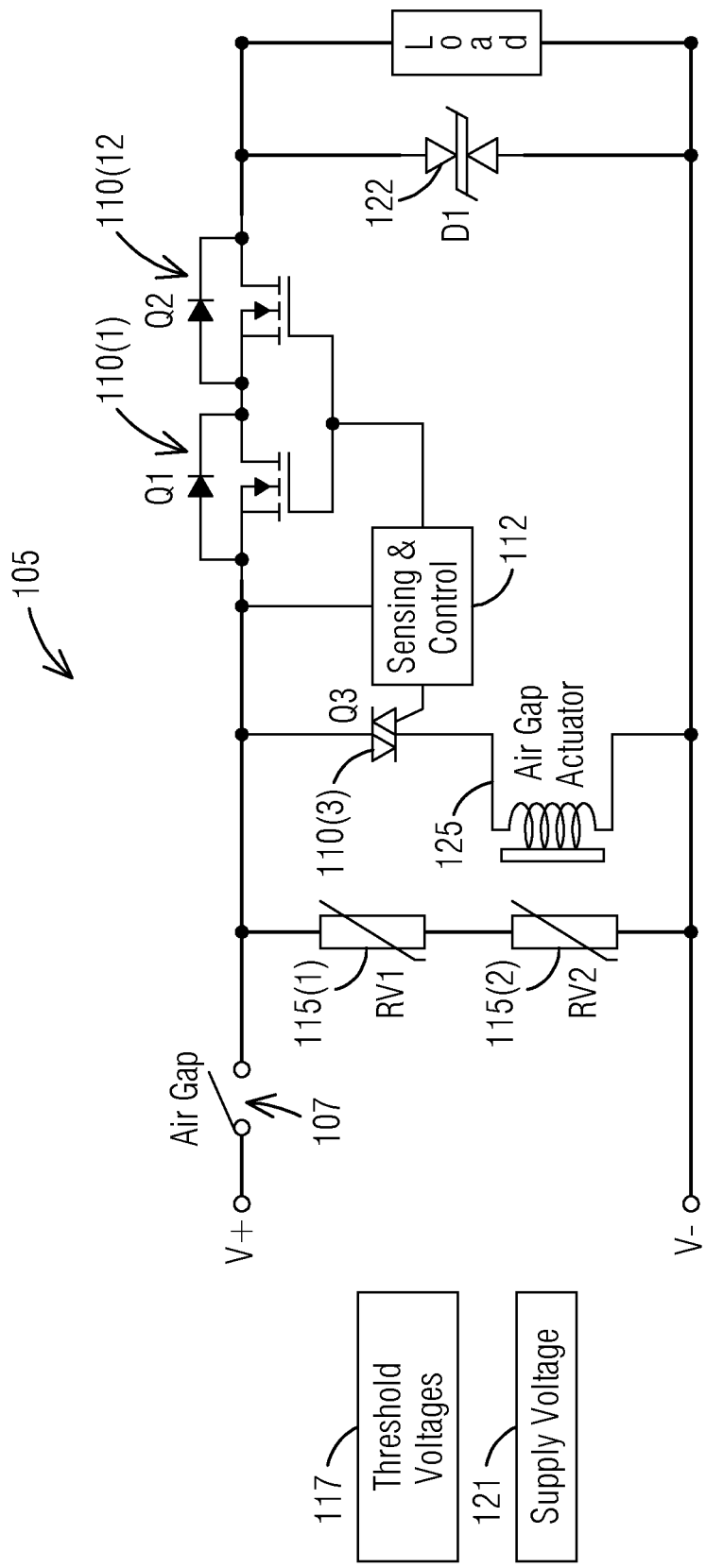
FIG. 1 illustrates a DC solid-state circuit breaker with fail-safe redundancy via double power electronics switching modules and double overvoltage protection devices in accordance with an exemplary embodiment of the present invention.

Various technologies that pertain to systems and methods that facilitate a DC solid-stat circuit breaker with fail-safe redundancy will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a DC solid-state circuit breaker that includes at least double power electronics switching modules and at least double overvoltage protection devices. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the DC solid-state circuit breaker according to the present disclosure are described below with reference to FIGS. 1-4 herein. Like reference numerals used in the drawings identify similar or identical elements throughout the several views. The drawings are not necessarily drawn to scale.

Consistent with one embodiment of the present invention, FIG. 1 represents a DC solid-state circuit breaker 105 in accordance with an exemplary embodiment of the present invention. The DC solid-state circuit breaker 105 provides fail-safe redundancy via double power electronics and double overvoltage protection. The DC solid-state circuit breaker 105 comprises an air gap 107 disposed in series to first and second power electronics switching modules, Q1, Q2 110(1-2). The DC solid-state circuit breaker 105 further comprises a sensing and control circuit 112 configured to realize designed functions. It should be noted that sensing and control circuit 112 in these diagrams are for demonstration purposes only, there are various ways to power sensing and control than shown in the figures.

The DC solid-state circuit breaker 105 further comprises first and second overvoltage protection devices RV1, RV2 115(1-2) connected in series for overvoltage or surge protection for the sensing and control circuit 112 such that both the first and second overvoltage protection devices RV1, RV2 115(1-2) have threshold voltages 117 higher than a system voltage 121. The DC solid-state circuit breaker 105 further comprises a load side overvoltage protection device D1 122 provided for overvoltage protection after switching OFF. The DC solid-state circuit breaker 105 further comprises an air gap actuator 125 with a first switching device Q3 110(3) that is configured to open the air gap 107 when necessary.

The first and second power electronics switching modules Q1, Q2 110(1-2) are each other's redundancy and the first and second overvoltage protection devices RV1, RV2 115 (1-2) are each other's redundancy such that either the first and second power electronics switching modules Q1, Q2 110(1-2) can realize circuit breaker functions without the other whereas under single component failure analysis, if the first power electronics switching module Q1, 110(1) is failed/shorted the second power electronics switching module Q2 110(2) can still be used to switch OFF a DC current first before opening the air gap 107 so that the air gap 107 is not required to interrupt the DC current.

In one embodiment, the first and second power electronics switching modules Q1, Q2 110(1-2) are power metal-oxide-semiconductor field-effect transistor (MOSFET) modules that can be a single MOSFET or multiple MOSFETs disposed in parallel or set in series. The first and second overvoltage protection devices RV1, RV2 115(1-2) are a Metal Oxide Varistor (MOV) or a transient-voltage-suppression (TVS) diode. The load side overvoltage protection device D1 122 is a MOV, a TVS diode or a snubber circuit etc.

In this embodiment, the air gap 107 may be in series to the two power MOSFET modules, Q1, Q2 110(1-2). The Q1 and Q2 can be single MOSFET or multiple MOSFETs put in parallel. The Q1 and Q2 are also set in series, where source of one module is connected to drain of the other module. The sensing and control circuit 112 is used to realize functions of the circuit breaker 105. The air gap actuator 125 with its own switching device, Q3 110(3), is used to open the air gap 107 when necessary. For overvoltage or surge protection for the sensing and control circuit 112, two devices 115(1-2), RV1 and RV2, such as MOV or TVS are connected in series. Both RV1 115(1) and RV2 115(2) (e.g., a fail-safe redundancy component) have the threshold voltages 117 higher than the system voltage 121. For overvoltage protection after switching off, the load side overvoltage protection device, D1 122, such as a MOV, a TVS or a snubber circuit can be used.

In this embodiment, Q1, Q2 110(1-2) are each other's redundancy, and RV1 and RV2 115(1-2) are each other's redundancy. Without redundancy, under circuit fault conditions, the sensing and control circuit 112 senses a fault condition and then sends a signal to switch OFF Q1. Then, the sensing and control circuit 112 sends a signal to turn ON Q3 110(3) to allow the air gap actuator 125 to open the air gap 107. Three problems may arise in this configuration. First, when the air gap 107 opens, it must interrupt the current supplied through Q3 110(3) to the air gap actuator 125. Depending on designs, the air gap 107 may not be able to interrupt such current at higher DC voltage. Second, under single component failure analysis, if Q1 fails as shorted, the air gap 107 is the only component that can be used to interrupt load current. Under a high DC voltage, a very complicated air gap is needed to interrupt such current. Third, under single component failure analysis, if RV1 is shorted, only the air gap 107 can open to stop the current drawn by RV1. Like before, under a high DC voltage, a complicated air gap design is needed.

Back to FIG. 1, three aspects are implemented in this invention to address the three problems above. First, Q2 is added in series to Q1. Either Q1 or Q2 can realize circuit breaker functions without the other. Therefore, under single component failure analysis, if Q1 is failed shorted Q2 can still be used to switch OFF the DC current first before opening the air gap 107. This way, the air gap 107 can be much simplified since it is not required to interrupt DC current. Second, Q3 is timed for just long enough to open the air gap 107 and then is turned OFF. This way, an arc may be drawn for short amount of time in the air gap 107, but Q3 will help to extinguish the arc by cutting off current when turned OFF, and an interruption is guaranteed. Third, since both RV1 and RV2 have higher threshold voltage than the system voltage 121, RV2 still can keep all the functions in case of RV1 is shorted. Then the control circuit 112 can detect RV1's failure and allow the air gap 107 to open without current. A drawback of using RV1 and RV2 in series is that components used in the circuit need to be sized up to the higher threshold voltage, which is the sum of threshold voltages 117 of RV1 and RV2.

The first switching device Q3 110(3) is timed for just long enough to open the air gap 107 and then it is turned OFF such that an arc may be drawn for a short amount of time in the air gap 107 but the first switching device Q3 110(3) helps to extinguish the arc by cutting off current when turned OFF so that an interruption is guaranteed.

Since both the first and second overvoltage protection devices RV1, RV2 115(1-2) have a higher threshold voltage 117 than the system voltage 121, the second overvoltage protection device RV2 115(2) still can keep all the functions in case of the first overvoltage protection device RV1 115(1) is shorted so that the sensing and control circuit 112 can detect the first overvoltage protection device's RV1 115(1) failure and allow the air gap 107 to open without current.

A drawback of using the first and second overvoltage protection devices RV1, RV2 115(1-2) in series is that components used in a circuit need to be sized up to a higher threshold voltage, which is the sum of threshold voltages 117 of the first and second overvoltage protection devices RV1, RV2 115(1-2).

Figure 2:
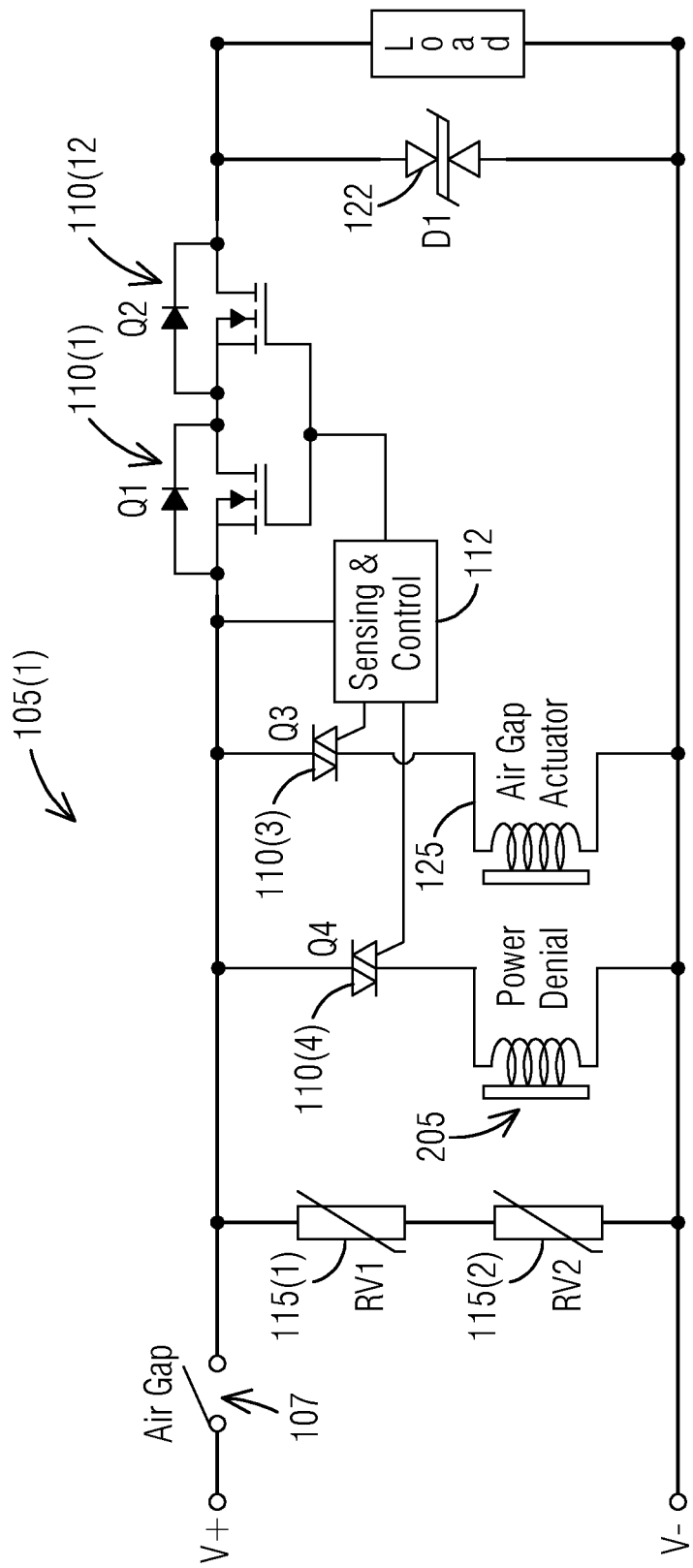
FIG. 2 illustrates a DC solid-state circuit breaker with power denial in accordance with an exemplary embodiment of the present invention.

Referring to FIG. 2, it illustrates a first DC solid-state circuit breaker 105(1) with power denial in accordance with an exemplary embodiment of the present invention. To further improve the DC solid-state circuit breaker 105, a power denial feature can be added, as shown in FIG. 2. The power denial feature, once engaged, can physically lock the air gap 107 in an open position without possibility of reclosing. This can be used if any failed components have been detected, such as the Q1 or RV1. If a component failure is detected, the sensing and control circuit 112 sends a signal to turn OFF Q1 and Q2, then sends a signal to turn ON a second switching device Q4 110(4) to engage a power denial mechanism. As described before, the Q4 110(4) is timed only long enough to open the air gap 107 and is turned OFF again after to ensure interruption.

The first DC solid-state circuit breaker 105(1) further comprises a power denial circuit 205 which once engaged can physically lock the air gap 107 in an open position without a possibility of reclosing such that a power denial mechanism can be used if any failed components have been detected, such as the first power electronics switching module Q1 110(1) or the first overvoltage protection device RV1 115(1). If a component failure is detected, the sensing and control circuit 112 sends a signal to turn OFF the first and second power electronics switching modules Q1, Q2 110(1-2), then sends a signal to turn ON the second switching device Q4 110(4) to engage the power denial mechanism. The second switching device Q4 110(4) is timed only long enough to open the air gap 107 and is turned OFF again after to ensure an interruption.

Figure 3:
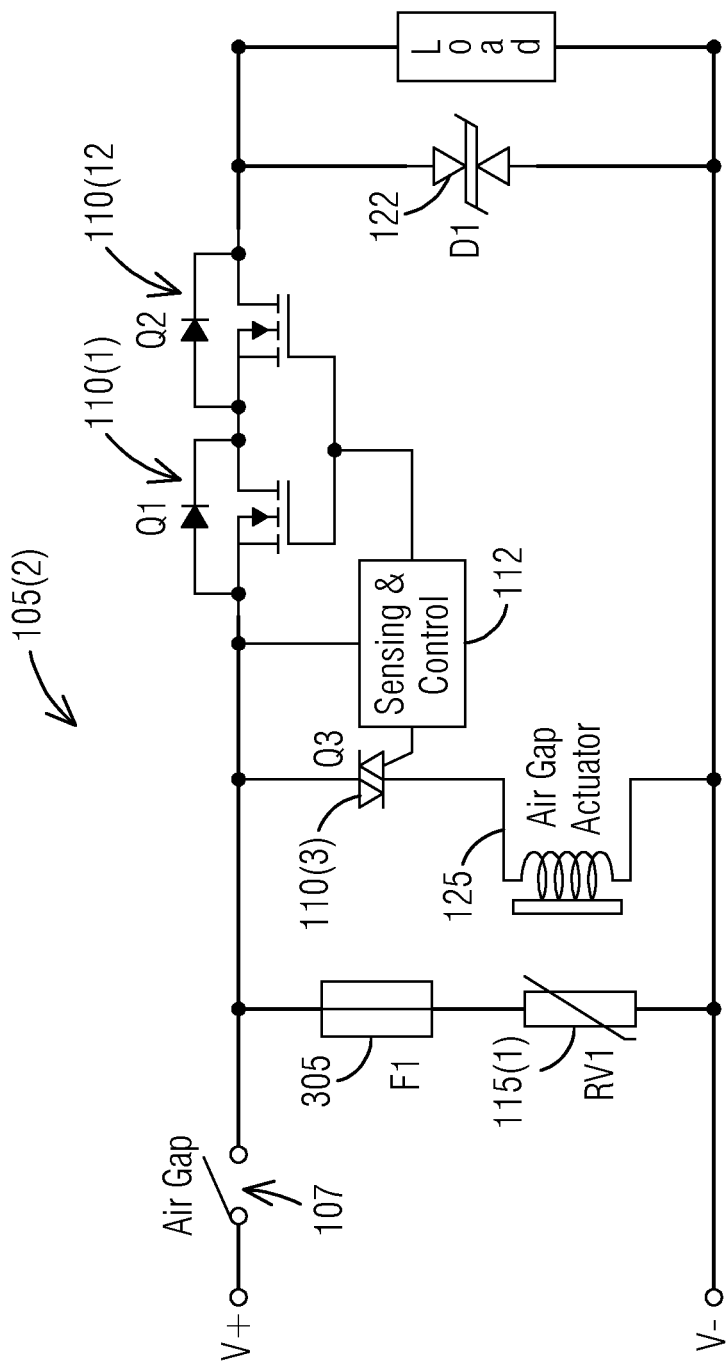
FIG. 3 illustrates a DC solid-state circuit breaker with fuse protection to RV1 in accordance with an exemplary embodiment of the present invention.

Turning now to FIG. 3, it illustrates a second DC solid-state circuit breaker 115(2) with a fuse protection to the first overvoltage protection device RV1 115(1) in accordance with an exemplary embodiment of the present invention. An alternative to RV1 redundancy is to use a fuse, F1 305, as RV1's protection device. That is, an alternative to the first overvoltage protection device RV1 115(1) redundancy is to use a fuse F1 305, as the second overvoltage protection device's protection device. The fuse F1 305 can be selected in such a way that it can stay closed during a short event, such as a surge, but open if the second overvoltage protection device RV1 115(1) is short and continuously drawing a current above a threshold.

Figure 4:
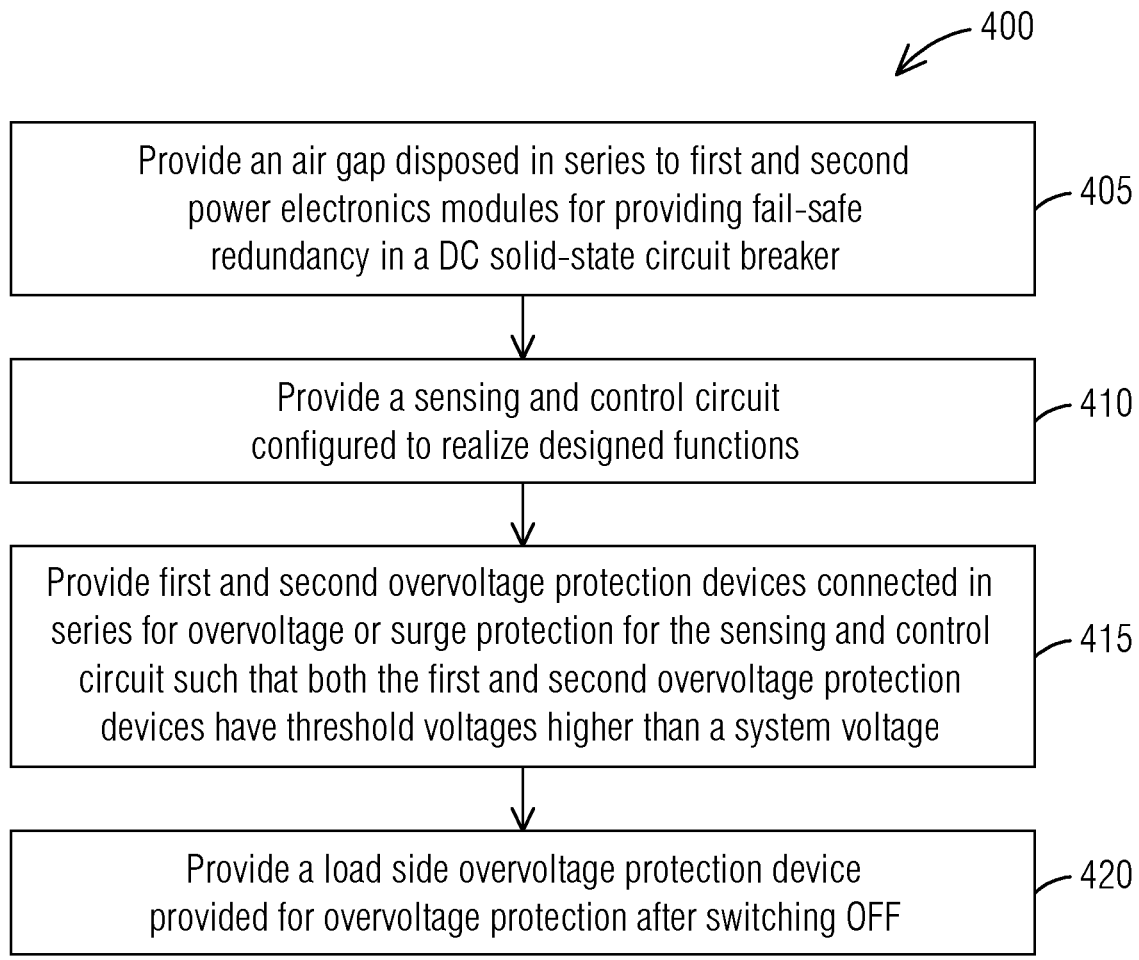
FIG. 4 illustrates a method for providing fail-safe redundancy in a DC solid-state circuit breaker in accordance with an exemplary embodiment of the present invention.

FIG. 4 illustrates a method 400 for providing fail-safe redundancy in the DC solid-state circuit breaker 105 in accordance with an exemplary embodiment of the present invention. Reference is made to the elements and features described in FIGS. 1-3. It should be appreciated that some steps are not required to be performed in any particular order, and that some steps are optional.

The method 400 comprises a step 405 of providing the air gap 107 disposed in series to the first and second power electronics switching modules Q1, Q2 110(1-2). The method 400 further comprises a step 410 of providing the sensing and control circuit 112 configured to realize designed functions. The method 400 further comprises a step 415 of providing the first and second overvoltage protection devices RV1, RV2 115(1-2) connected in series for over-voltage or surge protection for the sensing and control circuit 112 such that both the first and second overvoltage protection devices RV1, RV2 115(1-2) have threshold voltages 117 higher than the system voltage 121. The method 400 further comprises a step 420 of providing the load side overvoltage protection device D1 122 provided for overvoltage protection after switching OFF.

While a semiconductor material-based design of the first solid-state switching component such as metal-oxide-semiconductor field-effect transistors (MOSFETs) and Thyristors is described here a range of one or more other materials are also contemplated by the present invention. For example, other materials may be implemented based on one or more features presented above without deviating from the spirit of the present invention.

The techniques described herein can be particularly useful for a system architecture with redundant power electronics for a DC solid-state circuit breaker that reduces or eliminates DC arcs in air gaps under a single component failure mode analysis. While particular embodiments are described in terms of this arrangement, the techniques described herein are not limited to such an arrangement but can also be used with other arrangements.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A DC solid-state circuit breaker comprising:
    an air gap disposed in series to first and second power electronics switching modules,
    a sensing and control circuit configured to realize designed functions,
    a first overvoltage or surge protection device, connected in series to a fail-safe redundancy component, for the sensing and control circuit,
    a second load side overvoltage protection device provided for overvoltage protection after switching OFF,
    an air gap actuator with a first switching device that is configured to open the air gap when necessary,
    wherein the first and second power electronics switching modules are power metal-oxide-semiconductor field-effect transistor (MOSFET) modules configured as single MOSFET or multiple MOSFETs disposed in parallel or set in series, and
    wherein the first and second power electronics switching modules are each other's redundancy.

2. The DC solid-state circuit breaker of claim 1, wherein the load side overvoltage protection device is a MOV, a TVS diode or a snubber circuit etc.

3. The DC solid-state circuit breaker of claim 1, wherein the first switching device is timed for just long enough to open the air gap and then is turned OFF to assist interruption.

4. The DC solid-state circuit breaker of claim 1, further comprising:
    a power denial circuit which once engaged physically locks the air gap in an open position without a possibility of reclosing, wherein a power denial mechanism is used if any failed components have been detected.

5. The DC solid-state circuit breaker of claim 4, wherein if a component failure is detected, the sensing and control circuit sends a signal to turn OFF the first and second power electronics switching modules, then sends a signal to turn ON a second switching device to engage the power denial mechanism, and wherein the second switching device is timed only long enough to open the air gap and is turned OFF again after to ensure an interruption.

6. The DC solid-state circuit breaker of claim 1, wherein an alternative to the first overvoltage or surge protection device redundancy is to use a fuse, as the first overvoltage or surge protection device's protection device, wherein the fuse is selected in such a way that it stays closed during a short event, such as a surge, but opens if the first overvoltage or surge protection device is short and continuously drawing a current above a threshold.

7. A method for providing fail-safe redundancy in a DC solid-state circuit breaker, the method comprising:
provisioning an air gap disposed in series to first and second power electronics switching modules,
providing a sensing and control circuit configured to realize designed functions,
providing a first overvoltage or surge protection device, connected in series to a fail-safe redundancy component, for the sensing and control circuit, and
providing a second load side overvoltage protection device provided for overvoltage protection after switching OFF,
providing an air gap actuator with a first switching device that is configured to open the air gap when necessary,
wherein the first and second power electronics switching modules are power metal-oxide-semiconductor field-effect transistor (MOSFET) modules configured as single MOSFET or multiple MOSFETs disposed in parallel or set in series, and
wherein the first and second power electronics switching modules are each other's redundancy, wherein the first and second overvoltage or surge protection devices are a Metal Oxide Varistor (MOV) or a transient-voltage-suppression (TVS) diode.

8. The method of claim 7, wherein the load side overvoltage protection device is a MOV, a TVS diode or a snubber circuit etc.

9. The method of claim 7, wherein the first switching device is timed to open the air gap and then is turned OFF to assist interruption.

10. The method of claim 7, wherein, since both the first and second overvoltage or surge protection devices have a higher threshold voltage than a system voltage, the second overvoltage or surge protection device is configured to keep all functions in case of the first overvoltage or surge protection device is shorted.

11. The method of claim 7, further comprising:
providing a power denial circuit which once engaged physically locks the air gap in an open position without a possibility of reclosing, wherein a power denial mechanism is used if any failed components have been detected, wherein if a component failure is detected, the sensing and control circuit sends a signal to turn OFF the first and second power electronics switching modules, then sends a signal to turn ON a second switching device to engage the power denial mechanism, and wherein the second switching device is timed only long enough to open the air gap and is turned OFF again after to ensure an interruption.

12. The method of claim 7, wherein an alternative to the first overvoltage or surge protection device redundancy is a fuse, as the first overvoltage or surge protection device's protection device, wherein the fuse is selected in such a way that the fuse stays closed during a short event, such as a surge, but open if the first overvoltage or surge protection device is short and continuously drawing a current above a threshold.

13. The method of claim 7, wherein a first method of fail-safe redundancy is a second overvoltage or surge protection device whereas both the first overvoltage or surge protection device and the second overvoltage or surge protection device have threshold voltages higher than a system voltage.

14. The DC solid-state circuit breaker of claim 13, wherein a second method of fail-safe redundancy is a fuse.

15. The DC solid-state circuit breaker of claim 7, wherein a first method of fail-safe redundancy is a second overvoltage or surge protection device whereas both the first overvoltage or surge protection device and the second overvoltage or surge protection device have threshold voltages higher than a system voltage.

16. The DC solid-state circuit breaker of claim 15, wherein a second method of fail-safe redundancy is a fuse.

17. The DC solid-state circuit breaker of claim 15, wherein the first and second overvoltage or surge protection devices are a Metal Oxide Varistor (MOV) or a transient-voltage-suppression (TVS) diode.

18. The DC solid-state circuit breaker of claim 15, wherein, since both the first and second overvoltage or surge protection devices have a higher threshold voltage than the system voltage, the second overvoltage or surge protection device is configured to keep all functions in case of the first overvoltage or surge protection device is shorted.

* * * * *